(12) United States Patent
Huang et al.

(10) Patent No.: US 10,231,124 B2
(45) Date of Patent: Mar. 12, 2019

(54) ANTI-THEFT METHOD AND CLIENT FOR A MOBILE TERMINAL

(71) Applicant: Beijing Qihoo Technology Company Limited, Beijing (CN)

(72) Inventors: Zheng Huang, Beijing (CN);
Jiongxuan Zhang, Beijing (CN);
Guofeng Fan, Beijing (CN); Xuesong Yan, Beijing (CN); Yunyu Tan, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 245 days.

(21) Appl. No.: 15/103,972

(22) PCT Filed: Nov. 28, 2014

(86) PCT No.: PCT/CN2014/092559
§ 371 (c)(1),
(2) Date: Jun. 13, 2016

(87) PCT Pub. No.: WO2015/085871
PCT Pub. Date: Jun. 18, 2015

(65) Prior Publication Data
US 2016/0323742 A1    Nov. 3, 2016

(30) Foreign Application Priority Data

Dec. 13, 2013  (CN) .......................... 2013 1 0687136

(51) Int. Cl.
*H04W 12/06* (2009.01)
*H04L 29/06* (2006.01)
(Continued)

(52) U.S. Cl.
CPC ......... *H04W 12/06* (2013.01); *H04L 63/0853* (2013.01); *H04L 63/0876* (2013.01);
(Continued)

(58) Field of Classification Search
CPC ..... H04W 12/06; H04W 12/10; H04W 12/12; H04W 88/02; H04L 63/0853; H04L 63/123
(Continued)

(56) References Cited

U.S. PATENT DOCUMENTS

2012/0196571 A1* 8/2012 Grkov ..................... H04L 63/14
455/411
2014/0373184 A1* 12/2014 Mahaffey ................ G06F 21/88
726/35

FOREIGN PATENT DOCUMENTS

CN        1610436 A      4/2005
CN      101184265 A      5/2008
(Continued)

OTHER PUBLICATIONS

International Search Report of the International Searching Authority for Application No. PCT/CN2014/092559, dated Mar. 4, 2015.

*Primary Examiner* — Brandon S Hoffman
*Assistant Examiner* — Nega Woldemariam
(74) *Attorney, Agent, or Firm* — Alston & Bird LLP

(57) ABSTRACT

The invention provides an anti-theft method and client for a mobile terminal. Wherein, the anti-theft method for a mobile terminal comprises: receiving a background anti-theft opening instruction from a server, wherein the background anti-theft opening instruction carries verification information of the mobile terminal; parsing the background anti-theft opening instruction, obtaining the verification information and performing verification; and opening the anti-theft function in the background according to the background anti-theft opening instruction if the verification is passed. The embodiment of the invention can open the anti-theft function of a mobile terminal after the mobile terminal is lost, and then perform a corresponding anti-theft operation according to an anti-theft instruction, which achieves the beneficial effects (Continued)

of guaranteeing the security of the mobile terminal and fighting against theft crimes more reasonably and effectively.

10 Claims, 3 Drawing Sheets

(51) Int. Cl.
    *H04W 12/10*     (2009.01)
    *H04W 12/12*     (2009.01)
    *H04W 88/02*     (2009.01)

(52) U.S. Cl.
    CPC ........... *H04L 63/123* (2013.01); *H04W 12/10* (2013.01); *H04W 12/12* (2013.01); *H04W 88/02* (2013.01)

(58) Field of Classification Search
    USPC .......................................................... 726/7
    See application file for complete search history.

(56) References Cited

FOREIGN PATENT DOCUMENTS

| | | |
|---|---|---|
| CN | 101252703 A | 8/2008 |
| CN | 101594426 A | 12/2009 |
| CN | 102076125 A | 5/2011 |
| CN | 102387494 A | 3/2012 |
| CN | 102387498 A | 3/2012 |
| CN | 102413456 A | 4/2012 |
| CN | 103702331 A | 4/2014 |

\* cited by examiner

ANTI-THEFT METHOD AND CLIENT FOR A MOBILE TERMINAL

FIELD OF THE INVENTION

The invention relates to the field of internet applications, and in particular, to an anti-theft method and client for a mobile terminal.

BACKGROUND OF THE INVENTION

With the rapid development of intelligent mobile terminals and networks, mobile terminals (comprising a variety of devices such as mobile phones, tablets, etc.) play a more and more important role in people's lives, and increasingly become an indispensable all-around "assistant" in people's work and lives. For ease of use, when using an application of a mobile terminal, a person will generally store information such as various account information, private chat records and pictures/photos, etc. directly in the mobile terminal. Therefore, if the mobile terminal is lost, not only property loss would be brought about to the user, but what is more important is the private information stored in the mobile terminal by the user, for example, financial information such as an account password, etc., if the private information is leaked, it would be difficult to estimate the loss caused to the user. Therefore, anti-theft for a mobile terminal is very important.

In the prior art, a user can only open the anti-theft function of a mobile terminal before the mobile terminal is not lost. If the mobile terminal is lost before the anti-theft function is opened, then a theft can prevent the loser from recovering the mobile terminal by an operation of closing the mobile terminal or performing a flashing operation on the mobile terminal, or the like. For example, if a user opens the anti-theft function in a mobile phone, the user can know and obtain related information of the theft and the stolen mobile terminal after the mobile phone is lost. If the user does not open the mobile phone anti-theft before the mobile phone is lost, he can not use the anti-theft function to obtain the above information, and in turn can not recover the stolen mobile phone.

In summary, in the prior art, if the anti-theft function is not opened before a mobile terminal is lost, various anti-theft functions can not be used to obtain related information of the theft and the stolen mobile terminal after the mobile terminal is lost, which increases the difficulty in recovering the mobile terminal and can not fight against theft crimes effectively.

SUMMARY OF THE INVENTION

In view of the above problems, the invention is proposed to provide an anti-theft method for a mobile terminal and a corresponding client, which can overcome the above problem or at least partly solve or mitigate the above problem.

According to an aspect of the invention, there is provided an anti-theft method for a mobile terminal, applied in a mobile terminal of which the anti-theft function is not opened, comprising: receiving a background anti-theft opening instruction from a server, wherein the background anti-theft opening instruction carries verification information of the mobile terminal; parsing the background anti-theft opening instruction, obtaining the verification information and performing verification; and opening the anti-theft function in the background according to the background anti-theft opening instruction if the verification is passed.

According to another aspect of the invention, there is provided an anti-theft client for a mobile terminal, located in a mobile terminal of which the anti-theft function is not opened, comprising: a reception module configured to receive a background anti-theft opening instruction from a server, wherein the background anti-theft opening instruction carries verification information of the mobile terminal; a parse module configured to parse the background anti-theft opening instruction, obtain the verification information and perform verification; and an anti-theft opening module configured to open the anti-theft function in the background according to the background anti-theft opening instruction if the verification is passed.

According to still another aspect of the invention, there is provided a computer program comprising a computer readable code which causes a computing device to perform an anti-theft method for a mobile terminal as claimed in any of claims 1-11, when said computer readable code is running on the computing device.

According to yet still another aspect of the invention, there is provided a computer readable medium storing therein the computer program as claimed in claim 23.

In the embodiment of the invention, when a mobile terminal is lost, a background anti-theft opening instruction can be sent to the mobile terminal via a server. After the background anti-theft opening instruction is received, it is parsed and verified, which guarantees that the received background anti-theft instruction is an authentic, valid and trustworthy instruction, and avoids that the mobile terminal opens the anti-theft function erroneously due to reception of a background anti-theft instruction sent from an untrustworthy or malicious server. If a malicious server uses the anti-theft function to maliciously lock a mobile terminal and causes part or all of the functions of the mobile terminal to be unavailable, this will cause an adverse effect to the user. After the received background anti-theft opening instruction passes the verification, the embodiment of the invention opens the anti-theft function in the background of the mobile terminal according to the background anti-theft opening instruction, which solves the problem in the prior art that the anti-theft function can not be opened after the mobile terminal is lost. By employing a way of opening the anti-theft function remotely, the lost mobile terminal can be enabled to open anti-theft even without being recovered, which improves the security assurance of the mobile terminal, and the verification function therein also avoids that the anti-theft function is opened maliciously for the mobile terminal, which further improves the security of the mobile terminal. Therefore, the embodiment of the invention can open the anti-theft function of a mobile terminal after the mobile terminal is lost, and then perform corresponding anti-theft operations according to an anti-theft instruction, which achieves the beneficial effects of guaranteeing the security of the mobile terminal and fighting against theft crimes more reasonably and effectively.

The above description is merely an overview of the technical solutions of the invention. In the following particular embodiments of the invention will be illustrated in order that the technical means of the invention can be more clearly understood and thus may be embodied according to the content of the specification, and that the foregoing and other objects, features and advantages of the invention can be more apparent.

BRIEF DESCRIPTION OF THE DRAWINGS

Various other advantages and benefits will become apparent to those of ordinary skills in the art by reading the following detailed description of the preferred embodiments. The drawings are only for the purpose of showing the preferred embodiments, and are not considered to be limiting to the invention. And throughout the drawings, like reference signs are used to denote like components. In the drawings.

DETAILED DESCRIPTION OF THE INVENTION

In the following the invention will be further described in connection with the drawings and the particular embodiments.

It is mentioned in the related art that if the anti-theft function is not opened before a mobile terminal is lost, then the anti-theft function can not be opened and used remotely after the mobile terminal is lost, which results in an adverse consequence that the mobile terminal can not be recovered after lost.

Figure 1:
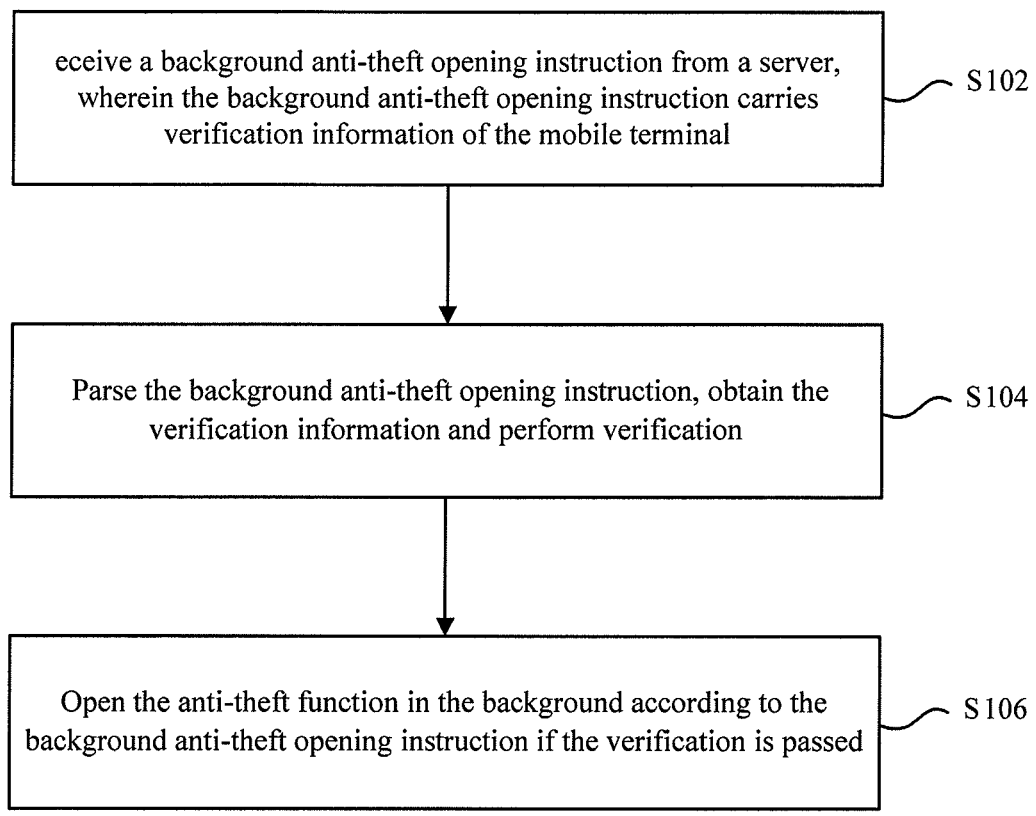
FIG. 1 shows schematically a processing flow chart of an anti-theft method for a mobile terminal according to an embodiment of the invention.

To solve the above technical problem, an embodiment of the invention provides an anti-theft method for a mobile terminal, which is applied in a mobile terminal of which the anti-theft function is not opened. FIG. 1 shows schematically a processing flow chart of an anti-theft method for a mobile terminal according to an embodiment of the invention. As shown in FIG. 1, the flow comprises at least step S102 to step S106.

At the step S102, a background anti-theft opening instruction from a server is received, wherein the background anti-theft opening instruction carries verification information of the mobile terminal.

At the step S104, the background anti-theft opening instruction is parsed, and the verification information is obtained and verified.

At the step S106, the anti-theft function is opened in the background according to the background anti-theft opening instruction if the verification is passed.

In the embodiment of the invention, when a mobile terminal is lost, a background anti-theft opening instruction can be sent to the mobile terminal via a server. After the background anti-theft opening instruction is received, it is parsed and verified, which guarantees that the received background anti-theft instruction is an authentic, valid and trustworthy instruction, and avoids that the mobile terminal opens the anti-theft function erroneously due to reception of a background anti-theft instruction sent from an untrustworthy or malicious server. If a malicious server uses the anti-theft function to maliciously lock a mobile terminal and causes part or all of the functions of the mobile terminal to be unavailable, this will cause an adverse effect to the user. After the received background anti-theft opening instruction passes verification, the embodiment of the invention opens the anti-theft function in the background of the mobile terminal according to the background anti-theft opening instruction, which solves the problem in the prior art that the anti-theft function can not be opened after the mobile terminal is lost. By employing a way of opening the anti-theft function remotely, the lost mobile terminal can be enabled to open anti-theft even without being recovered, which improves the security assurance of the mobile terminal, and the verification function therein also avoids that the anti-theft function is opened maliciously for the mobile terminal, which further improves the security of the mobile terminal. Therefore, the embodiment of the invention can open the anti-theft function of a mobile terminal after the mobile terminal is lost, and then perform corresponding anti-theft operations according to an anti-theft instruction, which achieves the beneficial effects of guaranteeing the security of the mobile terminal and fighting against theft crimes more reasonably and effectively.

In the embodiment of the invention, it is mentioned at the step S102 that the background anti-theft instruction carries verification information of the mobile terminal. Therein, the verification information of the mobile terminal (e.g., a mobile phone or a tablet computer) may comprise an unique identity identification of the mobile terminal and at least one subscriber identity module (SIM for short hereinafter) card number, may comprise an unique identity identification of the mobile terminal and user account information, or also may comprise an unique identity identification of the mobile terminal, at least one SIM card number and user account information at the same time. Of course, the verification information may also comprise other information that can verify the mobile terminal, for example, the hardware configuration of the mobile terminal, the hardware identification ID of the mobile terminal, and the system version number of the mobile terminal, and so on. Therein, in an embodiment of the invention, the international mobile equipment identity (IMEI for short hereinafter) number of the mobile terminal is preferred. The IMEI number itself is bound to a mobile terminal permanently and is unique and constant, with a high identifiability. Therefore, in an embodiment of the invention, preferably, the IMEI number is the unique identity identification of the mobile terminal.

Now, taking different verification information as an example, an anti-theft method for a mobile terminal provided by an embodiment of the invention will be described in detail. In this embodiment, three sets of verification information are preferred, respectively, a first set of verification information comprising the IMEI of the mobile terminal and at least one SIM card number, a second set of verification information comprising the IMEI of the mobile terminal and user account information, and a third set of verification information comprising the IMEI of the mobile terminal, at least one SIM card number and user account information at the same time.

Firstly, the first set of verification information is taken as an example for illustration. In the embodiment, the verification information of the mobile terminal comprises the IMEI of the mobile terminal and at least one SIM card number. After receiving an anti-theft opening instruction carrying the verification information, the embodiment of the invention performs the step S104 as shown in FIG. 1, to parse the received background anti-theft opening instruction and obtain the verification information carried in the background anti-theft opening instruction. After obtaining the verification information, the embodiment of the invention respectively verifies the IMEI and the at least one SIM card number in the verification information. First, the embodiment of the invention verifies the IMEI in the verification information. If the IMEI in the verification information matches the IMEI of the mobile terminal, then the IMEI in the verification information passes the verification. Second, the embodiment of the invention verifies the SIM card number in the verification information. If there is at least one SIM card number in the verification information which matches a SIM card number in the list of contacts of the mobile terminal, then the SIM card number in the verification information passes the verification. In addition, in the embodiment of the invention, it may also be possible to first verify that there is at least one SIM card number which matches a SIM card number in the list of contacts of the mobile terminal, and second, verify the IMEI in the verification information. In the embodiment of the invention, the order in which the IMEI and the at least one SIM card number contained in the verification information are verified will not be defined.

The number of the SIM card number(s) contained in the verification information in the embodiment of the invention may be any integer value other than 0, which will not be defined by the embodiment of the invention. For example, if the verification information contains 4 SIM card numbers, only one of the SIM card numbers matches a SIM card number in the list of contacts of the mobile terminal, and all the other three SIM card numbers do not match a SIM card number in the list of contacts of the mobile terminal, then the SIM card numbers in the verification information pass the verification. As another example, if the verification information contains only one SIM card number, and the SIM card number can match a SIM card number in the list of contacts of the mobile terminal, then the SIM card number in the verification information passes the verification. In a practical application, the list of contacts of a mobile terminal of a user will be changed irregularly due to a factor of the position being changed, the work place being changed, or the like. Therefore, in the embodiment of the invention, if one of the SIM card numbers contained in the verification information matches a SIM card number in the list of contacts of the mobile terminal, then the SIM card numbers in the verification information pass the verification. After the SIM card number in the verification information passes the verification, the SIM card number is identified as a trustworthy number. In the embodiment of the invention, the SIM card numbers that pass the verification are all identified as trustworthy numbers, which guarantees that in a subsequent operation, an anti-theft instruction sent by any trustworthy number can be recognized. Moreover, the embodiment of the invention performs an anti-theft operation according to an anti-theft instruction sent by a trustworthy number.

In the embodiment of the invention, if the IMEI in the verification information passes the verification, whereas there is no SIM card number that matches a SIM card number in the list of contacts of the mobile terminal, then the verification information can not pass the verification. Likewise, when there is at least one SIM card number in the verification information which matches a SIM card number in the list of contacts of the mobile terminal, but the IMEI in the verification information does not match the IMEI of the mobile terminal, then the verification information can not pass. In the embodiment of the invention, when the two kinds of information contained in the verification information pass the verification, the verification information passes the verification, which guarantees that a mobile terminal of a user will not open the anti-theft instruction because of a malicious operation of a person who engages in an illegal activity or a mistaken operation of the user, and avoids troubles brought about to the user due to opening the anti-theft function unnecessarily.

As described above, after the step S104 is performed, that is, after the verification information is verified, the step S106 as shown in FIG. 1 is performed if the verification is passed. At the step S106, the embodiment of the invention opens the anti-theft function in the background according to the background anti-theft opening instruction. After the anti-theft function is opened, when receiving an anti-theft instruction of a SIM card number identified as a trustworthy number, the embodiment of the invention parses the anti-theft instruction, and performs an anti-theft operation corresponding to the anti-theft instruction. In the embodiment of the invention, the SIM card number identified as a trustworthy number refers to a trustworthy SIM card number which is bound to the mobile terminal and passes the verification, for example, a commonly used SIM card number in an address book, a SIM card number of a specified white list, etc. After the mobile terminal opens the anti-theft function, the embodiment of the invention receives an anti-theft instruction sent by a SIM card number identified as a trustworthy number. The embodiment of the invention can perform a corresponding anti-theft operation according to the anti-theft instruction, to avoid loss of the mobile terminal, or provide a clue for recovering the mobile terminal after the mobile terminal is lost. For example, after a mobile phone of a user is lost, the embodiment of the invention can open the anti-theft function of the lost mobile phone via a server. After opening the anti-theft function, the embodiment of the invention sends an anti-theft instruction to the mobile phone via a bound relative's/friend's number. After receiving the anti-theft instruction, the mobile phone can, according to the anti-theft instruction, perform an operation of locking the screen automatically, or feeding a changed SIM card number back to the server, or returning the real-time location of the mobile phone to the server, or the like, to help the owner to recover the stolen mobile phone.

Secondly, the second set of verification information is taken as an example for illustration. In this embodiment, the verification information of the mobile terminal comprises the IMEI and user account information. After receiving an anti-theft opening instruction carrying the verification information, the embodiment of the invention performs the step S104 as shown in FIG. 1, to parse the received background anti-theft opening instruction and obtain the verification information carried in the background anti-theft opening instruction. After obtaining the verification information, the embodiment of the invention verifies the IMEI and the user account information in the verification information.

First, the embodiment of the invention verifies the IMEI in the verification information. If the IMEI in the verification information matches the IMEI of the mobile terminal, then the IMEI in the verification information passes the verification. Second, after the IMEI in the verification information passes the verification, the embodiment of the invention logs in the user account information to obtain the identity (ID for short hereinafter) of the account.

The user account information in the embodiment of the invention may be a username and a password, may be a username and a verification code selected randomly by the system, or also may be a user mailbox account, or the like, which will not be defined by the embodiment of the invention. Preferably, in an embodiment of the invention, a username and a password are selected as the user account information. In a practical application, the use of a username and a password as the account information for login can guarantee the security of the user account reasonably and effectively. If a username and a randomly selected verification code are used as the account information, although only the username needs to be remembered, and a password is not needed, which is comparatively convenient, this lacks the security. In addition, it is likewise comparatively convenient to use a mailbox account as the account information, however, the location where the mailbox account is logged in changes easily, which results in that the mailbox account is easily leaked and security risks also exist. Therefore, after the IMEI in the verification information passes the verification, the embodiment of the invention uses the username and the password to log in the account information to obtain the ID of the account.

After obtaining the account ID, the embodiment of the invention sends the account ID to the server, and the server verifies the account ID. After receiving the verification result resulting from the verification by the server, the embodiment of the invention determines whether the user account information passes the verification. If the user account information passes the verification, then the embodiment of the invention determines that the verification information passes the verification, and if the user account information does not pass the verification, then the embodiment of the invention determines that the verification information does not pass the verification.

In the embodiment of the invention, it is possible to first verify the IMEI in the verification information, and second, verify the user account information in the verification information. The embodiment of the invention may further first verify the user account information, and second, verify the IMEI in the verification information. The embodiment of the invention will not define the order in which the IMEI and the user account information in the verification information are verified. For verifying the IMEI in the verification information, the embodiment of the invention only needs to obtain its own IMEI and perform matching on the two IMEIs. For verifying the user account information in the verification information, the embodiment of the invention needs to log in the user account information, and after obtaining the account ID, send the account ID to the server for verification. As compared to the verification of the IMEI, the step of verifying the user account information is more tedious and complex. Therefore, in an embodiment of the invention, it is preferred to first verify the IMEI. After the IMEI in the verification information passes the verification, then the user account information in the verification information is verified, which guarantees that the verification information is verified more efficiently.

As described above, in the embodiment of the invention, when the two kinds of information contained in the verification information pass the verification, the verification information passes the verification, which guarantees that a mobile terminal of a user will not open the anti-theft instruction because of a malicious operation of a person who engages in an illegal activity or a mistaken operation of the user, and avoids troubles brought about to the user due to opening the anti-theft function unnecessarily.

After the verification information is verified, the performing of the step S104 finishes, and the embodiment of the invention continues to perform the step S106. At the step S106, after the verification information passes the verification, the embodiment of the invention opens the anti-theft function in the background according to the received background anti-theft opening instruction. After the anti-theft function is opened, when receiving an anti-theft instruction of the account ID which passes the verification, the embodiment of the invention parses the anti-theft instruction, and performs an anti-theft operation corresponding to the anti-theft instruction. For example, after a mobile phone of a user is lost, if no trustworthy number is bound to the lost mobile phone of the user, then the user can log in the server to open the anti-theft function of the lost mobile phone. After the anti-theft function of the lost mobile phone is opened, the embodiment of the invention can log in a registered account and send an anti-theft instruction to the mobile phone via the unique account ID in the account. After receiving the anti-theft instruction, the mobile phone can, according to the anti-theft instruction, perform an operation of locking the screen automatically, or feeding a changed SIM card number back to the server, or returning the real-time location of the mobile phone to the server, or the like, to help the owner to recover the stolen mobile phone.

Lastly, the third set of verification information is taken as an example for illustration. In this embodiment, the verification information of the mobile terminal comprises the IMEI, at least one SIM card number and user account information at the same time. After receiving an anti-theft opening instruction carrying the verification information, the embodiment of the invention performs the step S104 as shown in FIG. 1, to parse the received background anti-theft opening instruction and obtain the verification information carried in the background anti-theft opening instruction. After obtaining the verification information, the embodiment of the invention respectively verifies the IMEI, the at least one SIM card number and the user account information in the verification information. First, the embodiment of the invention verifies the IMEI in the verification information. If the IMEI in the verification information matches the IMEI of the mobile terminal, then the IMEI in the verification information passes the verification. Second, the embodiment of the invention verifies the SIM card number in the verification information. If there is at least one SIM card number in the verification information which matches a SIM card number in the list of contacts of the mobile terminal, then the SIM card number in the verification information passes the verification. In addition, in the embodiment of the invention, it may also be possible to first verify that there is at least one SIM card number which matches a SIM card number in the list of contacts of the mobile terminal, and second, verify the IMEI in the verification information, which will not be defined by the embodiment of the invention.

The format of the SIM card number(s) contained in the verification information in the embodiment of the invention may be any integer value other than 0, which will not be defined by the embodiment of the invention. For example, if the verification information contains 2 SIM card numbers, one of the SIM card numbers matches a SIM card number in the list of contacts of the mobile terminal, and the other SIM card number does not match a SIM card number in the list of contacts of the mobile terminal, then the SIM card numbers in the verification information pass the verification. In a practical application, the list of contacts of a mobile terminal of a user will be changed irregularly due to a factor of the position being changed, the work place being changed, or the like. Therefore, in the embodiment of the invention, if one of the SIM card numbers contained in the verification information matches a SIM card number in the list of contacts of the mobile terminal, then the SIM card numbers in the verification information pass the verification.

When the IMEI and the at least one SIM card number in the verification information pass the verification, the embodiment of the invention continues to verify the user account information in the verification information. The user account information in the embodiment of the invention may be a username and a password, may be a username and a verification code selected randomly by the system, or also may be a user mailbox account, or the like, which will not be defined by the embodiment of the invention. Preferably, in an embodiment of the invention, a username and a password are selected as the user account information. In a practical application, the use of a username and a password as the account information for login can guarantee the security of the user account reasonably and effectively. If a username and a randomly selected verification code are used as the account information, although only the username needs to be remembered, and a password is not needed, which is comparatively convenient, this lacks the security. In addition, it is likewise comparatively convenient to use a mailbox account as the account information, however, the location where the mailbox account is logged in changes easily, which results in that the mailbox account is easily leaked and security risks also exist. Therefore, after the IMEI and the at least one SIM card number in the verification information pass the verification, the embodiment of the invention uses the username and the password to log in the account information to obtain the ID of the account.

After obtaining the account ID, the embodiment of the invention sends the account ID to the server, and the server verifies the account ID. After receiving the verification result resulting from the verification by the server, the embodiment of the invention determines whether the user account information passes the verification. If the user account information does not pass the verification, then the embodiment of the invention determines that the verification information does not pass the verification. If the user account information passes the verification, then the embodiment of the invention determines that the verification information passes the verification.

In the embodiment of the invention, when the verification information of the mobile terminal contains the IMEI, at least one SIM card number and user account information, the verification information passes the verification if and only if the three pass the verification simultaneously. For example, when the IMEI and the at least one SIM card number in the verification information pass the verification, whereas the user account information in the verification information does not pass the verification, the verification information does not pass the verification. In addition, in the embodiment of the invention, if the IMEI in the verification information is first verified, and the IMEI does not pass the verification, then it is unnecessary to continue to verify the SIM card number and the user account information in the verification information, and the verification information can not pass the verification. In the embodiment of the invention, when all information contained in the verification information passes the verification, then the verification information passes the verification, which guarantees that a mobile terminal of a user will not open the anti-theft instruction because of a malicious operation of a person who engages in an illegal activity or a mistaken operation of the user, and avoids troubles brought about to the user due to opening the anti-theft function unnecessarily.

After the verification information is verified, the performing of the step S104 finishes, and the embodiment of the invention continues to perform the step S106. At the step S106, after the verification information passes the verification, the embodiment of the invention opens the anti-theft function in the background according to the received background anti-theft opening instruction. After the anti-theft function is opened, when receiving an anti-theft instruction of the account ID which passes the verification, the embodiment of the invention parses the anti-theft instruction, and performs an anti-theft operation corresponding to the anti-theft instruction. For example, after a mobile phone of a user is lost, the embodiment of the invention can log in the server to send a background anti-theft opening instruction to the lost mobile phone. After the anti-theft function is opened in the background of the mobile phone, the embodiment of the invention can send an anti-theft instruction to the lost mobile phone via a bound relative's/friend's number or the ID in registered user account information. After receiving the anti-theft instruction, the mobile phone can, according to the anti-theft instruction, perform an operation of locking the screen automatically, or feeding a changed SIM card number back to the server, or returning the real-time location of the mobile phone to the server, or the like, to help the owner to recover the stolen mobile phone.

Based on the anti-theft methods for a mobile terminal provided by the above preferred embodiments, and based on the same concept, an embodiment of the invention provides a client, located in a mobile terminal of which the anti-theft function is not opened, to implement the anti-theft methods for a mobile terminal as described.

Figure 2:
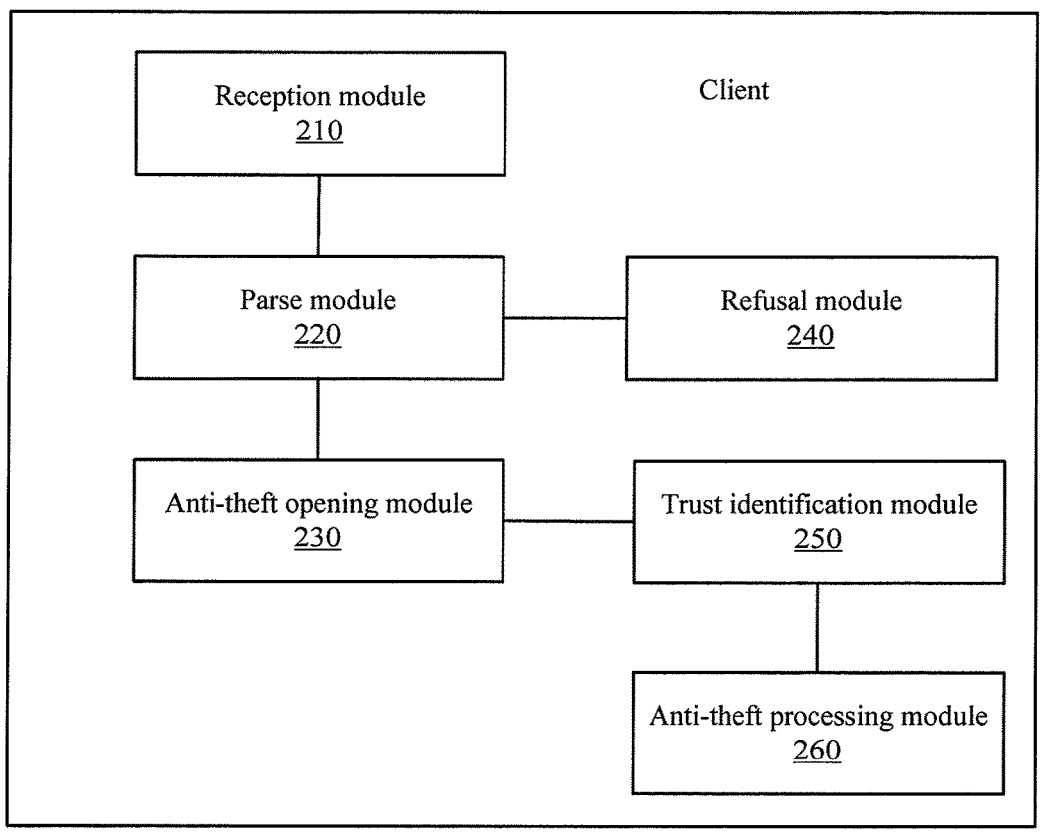
FIG. 2 shows schematically a structural schematic diagram of an anti-theft client for a mobile terminal according to an embodiment of the invention.

FIG. 2 shows schematically a structural schematic diagram of an anti-theft client for a mobile terminal according to an embodiment of the invention. With reference to FIG. 2, the client of the embodiment of the invention comprises at least a reception module 210, a parse module 220 and an anti-theft opening module 230.

Now, functions of each device or component and connection relationships among each part of the client of the embodiment of the invention will be introduced.

The reception module 210 is configured to receive a background anti-theft opening instruction from a server, wherein the background anti-theft opening instruction carries verification information of the mobile terminal.

The parse module 220 is coupled to the reception module 210 and configured to parse the background anti-theft opening instruction, obtain the verification information and perform verification.

The anti-theft opening module 230 is coupled to the parse module 220 and configured to open the anti-theft function in the background according to the background anti-theft opening instruction if the verification is passed.

In the embodiment of the invention, when a mobile terminal is lost, a background anti-theft opening instruction can be sent to the mobile terminal via a server. After the background anti-theft opening instruction is received, it is parsed and verified, which guarantees that the received background anti-theft instruction is an authentic, valid and trustworthy instruction, and avoids that the mobile terminal opens the anti-theft function erroneously due to reception of a background anti-theft instruction sent from an untrustworthy or malicious server. If a malicious server uses the anti-theft function to maliciously lock a mobile terminal and causes part or all of the functions of the mobile terminal to be unavailable, this will cause an adverse effect to the user. After the received background anti-theft opening instruction passes verification, the embodiment of the invention opens the anti-theft function in the background of the mobile terminal according to the background anti-theft opening instruction, which solves the problem in the prior art that the anti-theft function can not be opened after the mobile terminal is lost. By employing a way of opening the anti-theft function remotely, the lost mobile terminal can be enabled to open anti-theft even without being recovered, which improves the security assurance of the mobile terminal, and the verification function therein also avoids that the anti-theft function is opened maliciously for the mobile terminal, which further improves the security of the mobile terminal. Therefore, the embodiment of the invention can open the anti-theft function of a mobile terminal after the mobile terminal is lost, and then perform corresponding anti-theft operations according to an anti-theft instruction, which achieves the beneficial effects of guaranteeing the security of the mobile terminal and fighting against theft crimes more reasonably and effectively.

In the embodiment of the invention, the reception module 210 as shown in FIG. 2 receives a background anti-theft opening instruction from a server, wherein the background anti-theft opening instruction of the server carries verification information of the mobile terminal.

In the embodiment of the invention, the verification information of the mobile terminal (e.g., a mobile phone or a tablet computer) may comprise an unique identity identification of the mobile terminal and at least one SIM card number, may comprise an unique identity identification of the mobile terminal and user account information, or also may comprise an unique identity identification of the mobile terminal, at least one SIM card number and user account information at the same time. Therein, in an embodiment of the invention, the IMEI is preferred. The IMEI itself is bound to a mobile terminal permanently and is unique and constant, with a high identifiability. Therefore, in an embodiment of the invention, preferably, the IMEI is the unique identity identification of the mobile terminal.

Now, taking different verification information as an example, an anti-theft client for a mobile terminal provided by an embodiment of the invention will be described in detail. In this embodiment, three sets of verification information are preferred, respectively, a first set of verification information comprising the IMEI of the mobile terminal and at least one SIM card number, a second set of verification information comprising the IMEI of the mobile terminal and user account information and a third set of verification information comprising the IMEI of the mobile terminal, at least one SIM card number and user account information at the same time.

Firstly, the first set of verification information is taken as an example for illustration. In the embodiment, the verification information of the mobile terminal comprises the IMEI of the mobile terminal and at least one SIM card number. After receiving an anti-theft opening instruction carrying the verification information, the reception module 210 triggers the parse module 220. After triggered, the parse module 220 parses the anti-theft opening instruction and obtains the verification information carried in the background anti-theft opening instruction. After obtaining the verification information, the parse module 220 continues to respectively verify the IMEI and the at least one SIM card number in the verification information. First, the parse module 220 verifies the IMEI in the verification information. If the IMEI in the verification information matches the IMEI of the mobile terminal, then the IMEI in the verification information passes the verification. Second, the parse module 220 verifies the SIM card number in the verification information. If there is at least one SIM card number in the verification information which matches a SIM card number in the list of contacts of the mobile terminal, then the SIM card number in the verification information passes the verification. In addition, the parse module 220 in the embodiment of the invention may also first verify that there is at least one SIM card number which matches a SIM card number in the list of contacts of the mobile terminal, and second, verify the IMEI in the verification information. In the embodiment of the invention, the order in which the IMEI and the at least one SIM card number contained in the verification information are verified will not be defined.

The number of the SIM card number(s) contained in the verification information in the embodiment of the invention may be any integer value other than 0, which will not be defined by the embodiment of the invention. For example, if the verification information contains 4 SIM card numbers, only one of the SIM card numbers matches a SIM card number in the list of contacts of the mobile terminal, and all the other three SIM card numbers do not match a SIM card number in the list of contacts of the mobile terminal, then the SIM card numbers in the verification information pass the verification. As another example, if the verification information contains only one SIM card number, and the SIM card number can match a SIM card number in the list of contacts of the mobile terminal, then the SIM card number in the verification information passes the verification. In a practical application, the list of contacts of a mobile terminal of a user will be changed irregularly due to a factor of the position being changed, the work place being changed, or the like. Therefore, in the embodiment of the invention, if one of the SIM card numbers contained in the verification information matches a SIM card number in the list of contacts of the mobile terminal, then the SIM card numbers in the verification information pass the verification.

In the embodiment of the invention, if the IMEI in the verification information passes the verification, whereas there is no SIM card number that matches a SIM card number in the list of contacts of the mobile terminal, then the verification information can not pass the verification. Likewise, when there is at least one SIM card number in the verification information which matches a SIM card number in the list of contacts of the mobile terminal, but the IMEI in the verification information does not match the IMEI of the mobile terminal, then the verification information can not pass. In the embodiment of the invention, when the two kinds of information contained in the verification information pass the verification, the verification information passes the verification, which guarantees that a mobile terminal of a user will not open the anti-theft instruction because of a malicious operation of a person who engages in an illegal activity or a mistaken operation of the user, and avoids troubles brought about to the user due to opening the anti-theft function unnecessarily.

As described above, if the verification information does not pass the verification according to the parse module 220 after verifying the verification information, the parse module 220 triggers a refusal module 240. The refusal module 240 refuses to execute the background anti-theft opening instruction after triggered. If the verification information passes the verification according to the parse module 220, then the anti-theft opening module 230 as shown in FIG. 2 opens the anti-theft function in the background according to the background anti-theft opening instruction. After the anti-theft function is opened, a trust identification module 250 coupled to the anti-theft opening module 230 identifies the at least one SIM card number that passes the verification as a trustworthy SIM card number. When receiving an anti-theft instruction sent by a SIM card number identified as a trustworthy number, an anti-theft processing module 260 performs a corresponding anti-theft operation according to the anti-theft instruction, to avoid loss of the mobile terminal, or provide a clue for recovering the mobile terminal after the mobile terminal is lost.

Secondly, the second set of verification information is taken as an example for illustration. In this embodiment, the verification information of the mobile terminal comprises the IMEI and user account information. After receiving an anti-theft opening instruction carrying the verification information, the reception module 210 in the client triggers the parse module 220. The parse module 220 parses the received background anti-theft opening instruction and obtains the verification information carried in the background anti-theft opening instruction. After obtaining the verification information, the parse module 220 verifies the IMEI and the user account information in the verification information.

First, the parse module 220 verifies the IMEI in the verification information. If the IMEI in the verification information matches the IMEI of the mobile terminal, then the IMEI in the verification information passes the verification. Second, after the IMEI in the verification information passes the verification, the embodiment of the invention logs in the user account information to obtain the ID of the account.

The user account information in the embodiment of the invention may be a username and a password, may be a username and a verification code selected randomly by the system, or also may be a user mailbox account, or the like, which will not be defined by the embodiment of the invention. Preferably, in an embodiment of the invention, a username and a password are selected as the user account information. In a practical application, the use of a username and a password as the account information for login can guarantee the security of the user account reasonably and effectively. If a username and a randomly selected verification code are used as the account information, although only the username needs to be remembered, and a password is not needed, which is comparatively convenient, this lacks the security. In addition, it is likewise comparatively convenient to use a mailbox account as the account information, however, the location where the mailbox account is logged in changes easily, which results in that the mailbox account is easily leaked and security risks also exist. Therefore, after the IMEI in the verification information passes the verification, the embodiment of the invention uses the username and the password to log in the account information to obtain the ID of the account.

After obtaining the account ID, the parse module 220 verifies the account ID by sending the account ID to the server. After receiving the verification result resulting from the verification by the server, the parse module 220 determines whether the user account information passes the verification. If the user account information passes the verification, then the parse module 220 determines that the verification information passes the verification, and triggers the anti-theft opening module 230. The anti-theft opening module 230 opens the anti-theft function in the background. If the user account information does not pass the verification, then the parse module 220 triggers the refusal module 240. The refusal module 240 refuses to open the anti-theft function in the background.

In the embodiment of the invention, the parse module 220 may first verify the IMEI in the verification information, and second, verify the user account information in the verification information. The parse module 220 may further first verify the user account information, and second, verify the IMEI in the verification information. For verifying the IMEI in the verification information, the embodiment of the invention only needs to obtain its own IMEI and perform matching on the two IMEIs. For verifying the user account information in the verification information, the embodiment of the invention needs to log in the user account information, and after obtaining the account ID, send the account ID to the server for verification. As compared to the verification of the IMEI, the step of verifying the user account information is more tedious and complex. Therefore, in an embodiment of the invention, it is preferred to first verify the IMEI. After the IMEI in the verification information passes the verification, then the user account information in the verification information is verified, which guarantees that the verification information is verified more efficiently.

After the anti-theft opening module 230 opens the anti-theft function, if the anti-theft processing module 260 receives an anti-theft instruction sent by the account ID which passes the verification, the anti-theft processing module 260 parses the anti-theft instruction. After the parsing, the anti-theft processing module 260 performs a corresponding anti-theft operation according to the anti-theft instruction. For example, after a mobile phone of a user is lost, the server is logged in to send an anti-theft opening instruction to the lost mobile phone, and the reception module 210 of the client in the embodiment of the invention verifies the anti-theft opening instruction after receiving the background anti-theft opening instruction. If the background anti-theft opening instruction passes the verification, the anti-theft opening module 230 opens the background anti-theft function, and the anti-theft processing module 260 performs a corresponding operation according to the received anti-theft instruction, for example, according to the received anti-theft instruction, performs an operation of locking the screen automatically, or feeding a changed SIM card number back to the server, or returning the real-time location of the mobile phone to the server, or the like, to help the owner to recover the stolen mobile phone.

Lastly, the third set of verification information is taken as an example for illustration. In this embodiment, the verification information of the mobile terminal comprises the IMEI, at least one SIM card number and user account information at the same time. After receiving an anti-theft opening instruction carrying the verification information, the reception module 210 of the client as shown in FIG. 2 triggers the parse module 220. The parse module 220 parses the received background anti-theft opening instruction and obtains the verification information carried in the background anti-theft opening instruction. After obtaining the verification information, the parse module 220 respectively verifies the IMEI, the at least one SIM card number and the user account information in the verification information. First, the parse module 220 verifies the IMEI in the verification information. If the IMEI in the verification information matches the IMEI of the mobile terminal, then the IMEI in the verification information passes the verification. Second, the parse module 220 verifies the SIM card number in the verification information. If there is at least one SIM card number in the verification information which matches a SIM card number in the list of contacts of the mobile terminal, then the SIM card number in the verification information passes the verification. In addition, the parse module 220 may also first verify that there is at least one SIM card number which matches a SIM card number in the list of contacts of the mobile terminal, and second, verify the IMEI in the verification information, which will not be defined by the embodiment of the invention.

The format of the SIM card number(s) contained in the verification information in the embodiment of the invention may be any integer value other than 0, which will not be defined by the embodiment of the invention. For example, if the verification information contains 2 SIM card numbers, one of the SIM card numbers matches a SIM card number in the list of contacts of the mobile terminal, and the other SIM card number does not match a SIM card number in the list of contacts of the mobile terminal, then the SIM card numbers in the verification information pass the verification. In a practical application, the list of contacts of a mobile terminal of a user will be changed irregularly due to a factor of the position being changed, the work place being changed, or the like. Therefore, in the embodiment of the invention, if one of the SIM card numbers contained in the verification information matches a SIM card number in the list of contacts of the mobile terminal, then the SIM card numbers in the verification information pass the verification.

When the IMEI and the at least one SIM card number in the verification information pass the verification, the trust identification module 250 identifies the SIM card number that passes the verification as a trustworthy card number. In addition, the parse module 220 continues to verify the user account information in the verification information. The user account information in the embodiment of the invention may be a username and a password, may be a username and a verification code selected randomly by the system, or also may be a user mailbox account, or the like, which will not be defined by the embodiment of the invention. Preferably, in an embodiment of the invention, a username and a password are selected as the user account information. In a practical application, the use of a username and a password as the account information for login can guarantee the security of the user account reasonably and effectively. If a username and a randomly selected verification code are used as the account information, although only the username needs to be remembered, and a password is not needed, which is comparatively convenient, this lacks the security. In addition, it is likewise comparatively convenient to use a mailbox account as the account information, however, the location where the mailbox account is logged in changes easily, which results in that the mailbox account is easily leaked and security risks also exist. Therefore, after the IMEI and the at least one SIM card number in the verification information pass the verification, the embodiment of the invention uses the username and the password to log in the account information to obtain the ID of the account.

After obtaining the account ID, the parse module 220 sends the account ID to the server, and the server verifies the account ID. After receiving the verification result resulting from the verification by the server, the parse module 220 determines whether the user account information passes the verification. If the user account information does not pass the verification, then the parse module 220 determines that the verification information does not pass the verification. If the user account information passes the verification, then the parse module 220 determines that the verification information passes the verification.

In the embodiment of the invention, when the verification information of the mobile terminal contains the IMEI, at least one SIM card number and user account information, the verification information passes the verification if and only if the three pass the verification simultaneously. For example, when the IMEI and the at least one SIM card number in the verification information pass the verification, whereas the user account information in the verification information does not pass the verification, the verification information does not pass the verification. In addition, in the embodiment of the invention, if the IMEI in the verification information is first verified, and the IMEI does not pass the verification, then it is unnecessary to continue to verify the SIM card number and the user account information in the verification information, and the verification information can not pass the verification. In the embodiment of the invention, when all information contained in the verification information passes the verification, then the verification information passes the verification, which guarantees that a mobile terminal of a user will not open the anti-theft instruction because of a malicious operation of a person who engages in an illegal activity or a mistaken operation of the user, and avoids troubles brought about to the user due to opening the anti-theft function unnecessarily.

After the parse module 220 in the client determines that the verification information does not pass the verification, the parse module 220 triggers the refusal module 240. After the parse module 220 in the client determines that the verification information passes the verification, the parse module 220 triggers the anti-theft opening module 230. After the anti-theft function is opened, when the anti-theft processing module 260 receives an anti-theft instruction of the account ID which passes the verification, the embodiment of the invention parses the anti-theft instruction, and performs an anti-theft operation corresponding to the anti-theft instruction.

For example, after a mobile phone of a user is lost, the server is logged in to send a background anti-theft opening instruction to the lost mobile phone. The client in the embodiment of the invention verifies the background anti-theft opening instruction after receiving it. If the background anti-theft opening instruction passes the verification, then the anti-theft function is opened in the background of the mobile phone. After the anti-theft function is opened in the background of the mobile phone, an anti-theft instruction can be sent to the lost mobile phone via a bound relative's/friend's number or the ID in registered user account information. After receiving the anti-theft instruction, the mobile phone can, according to the anti-theft instruction, perform an operation of locking the screen automatically, or feeding a changed SIM card number back to the server, or returning the real-time location of the mobile phone to the server, or the like, to help the owner to recover the stolen mobile phone.

According to any one of the preferred embodiments or a combination of multiple preferred embodiments, the embodiment of the invention can achieve the following beneficial effects:

In the embodiments of the invention, when a mobile terminal is lost, a background anti-theft opening instruction can be sent to the mobile terminal via a server. After the background anti-theft opening instruction is received, it is parsed and verified, which guarantees that the received background anti-theft instruction is an authentic, valid and trustworthy instruction, and avoids that the mobile terminal opens the anti-theft function erroneously due to reception of a background anti-theft instruction sent from an untrustworthy or malicious server. If a malicious server uses the anti-theft function to maliciously lock a mobile terminal and causes part or all of the functions of the mobile terminal to be unavailable, this will cause an adverse effect to the user. After the received background anti-theft opening instruction passes verification, the embodiments of the invention open the anti-theft function in the background of the mobile terminal according to the background anti-theft opening instruction, which solves the problem in the prior art that the anti-theft function can not be opened after the mobile terminal is lost. By employing a way of opening the anti-theft function remotely, the lost mobile terminal can be enabled to open anti-theft even without being recovered, which improves the security assurance of the mobile terminal, and the verification function therein also avoids that the anti-theft function is opened maliciously for the mobile terminal, which further improves the security of the mobile terminal. Therefore, the embodiments of the invention can open the anti-theft function of a mobile terminal after the mobile terminal is lost, and then perform corresponding anti-theft operations according to an anti-theft instruction, which achieves the beneficial effects of guaranteeing the security of the mobile terminal and fighting against theft crimes more reasonably and effectively.

In the specification provided herein, a plenty of particular details are described. However, it can be appreciated that an embodiment of the invention may be practiced without these particular details. In some embodiments, well known methods, structures and technologies are not illustrated in detail so as not to obscure the understanding of the specification.

Similarly, it shall be appreciated that in order to simplify the disclosure and help the understanding of one or more of all the inventive aspects, in the above description of the exemplary embodiments of the invention, sometimes individual features of the invention are grouped together into a single embodiment, figure or the description thereof. However, the disclosed methods should not be construed as reflecting the following intention, namely, the claimed invention claims more features than those explicitly recited in each claim. More precisely, as reflected in the following claims, an aspect of the invention lies in being less than all the features of individual embodiments disclosed previously. Therefore, the claims complying with a particular implementation are hereby incorporated into the particular implementation, wherein each claim itself acts as an individual embodiment of the invention.

It may be appreciated to those skilled in the art that modules in a device in an embodiment may be changed adaptively and arranged in one or more device different from the embodiment. Modules or units or assemblies may be combined into one module or unit or assembly, and additionally, they may be divided into multiple sub-modules or sub-units or subassemblies. Except that at least some of such features and/or procedures or units are mutually exclusive, all the features disclosed in the specification (including the accompanying claims, abstract and drawings) and all the procedures or units of any method or device disclosed as such may be combined employing any combination. Unless explicitly stated otherwise, each feature disclosed in the specification (including the accompanying claims, abstract and drawings) may be replaced by an alternative feature providing an identical, equal or similar objective.

Furthermore, it can be appreciated to the skilled in the art that although some embodiments described herein comprise some features and not other features comprised in other embodiment, a combination of features of different embodiments is indicative of being within the scope of the invention and forming a different embodiment. For example, in the following claims, any one of the claimed embodiments may be used in any combination.

Embodiments of the individual components of the invention may be implemented in hardware, or in a software module running on one or more processors, or in a combination thereof. It will be appreciated by those skilled in the art that, in practice, some or all of the functions of some or all of the components in a client according to individual embodiments of the invention may be realized using a microprocessor or a digital signal processor (DSP). The invention may also be implemented as a device or apparatus program (e.g., a computer program and a computer program product) for carrying out a part or all of the method as described herein. Such a program implementing the invention may be stored on a computer readable medium, or may be in the form of one or more signals. Such a signal may be obtained by downloading it from an Internet website, or provided on a carrier signal, or provided in any other form.

Figure 3:
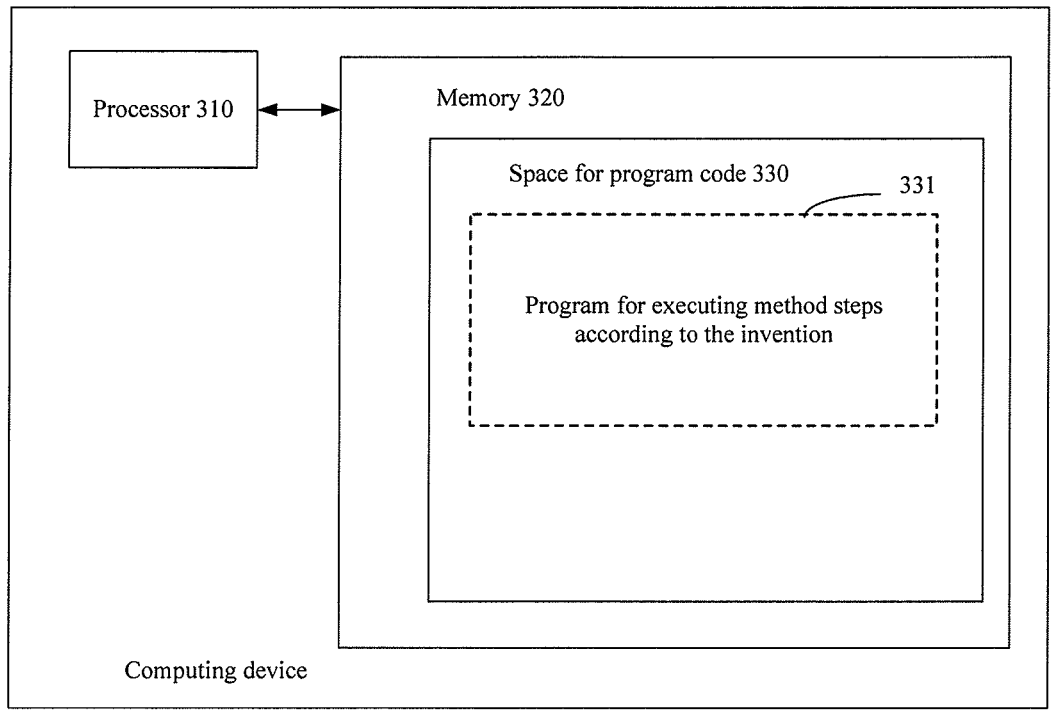
FIG. 3 shows schematically a block diagram of a computing device for performing an anti-theft method for a mobile terminal according to the invention.
Figure 4:
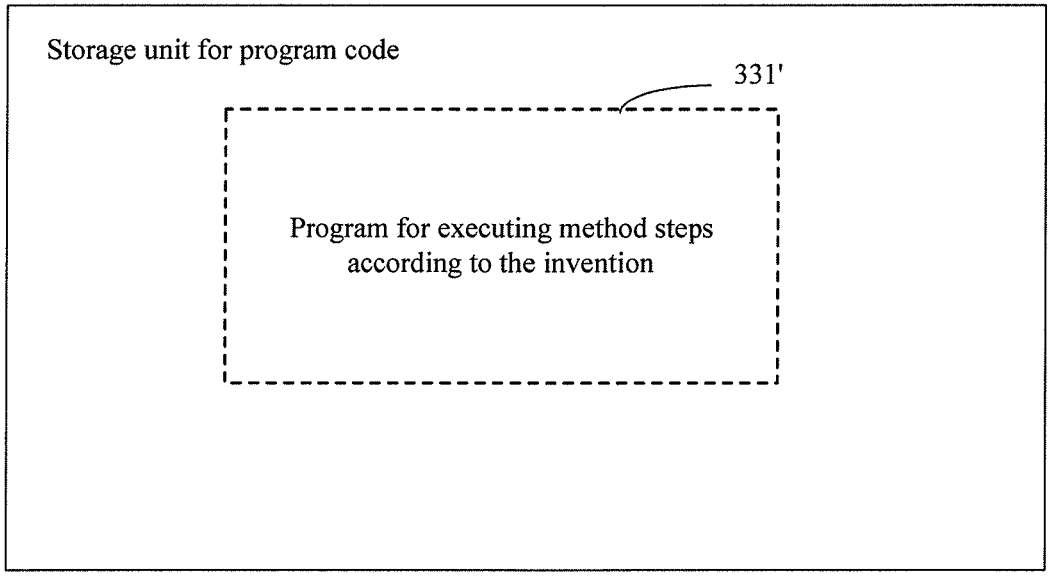
FIG. 4 shows schematically a storage unit for retaining or carrying a program code implementing an anti-theft method for a mobile terminal according to the invention.

For example, FIG. 3 shows a computing device which may carry out an anti-theft method for a mobile terminal according to the invention. The computing device traditionally comprises a processor 310 and a computer program product or a computer readable medium in the form of a memory 320. The memory 320 may be an electronic memory such as a flash memory, an EEPROM (electrically erasable programmable read-only memory), an EPROM, a hard disk or a ROM. The memory 320 has a memory space 330 for a program code 331 for carrying out any method steps in the methods as described above. For example, the memory space 330 for a program code may comprise individual program codes 331 for carrying out individual steps in the above methods, respectively. The program codes may be read out from or written to one or more computer program products. These computer program products comprise such a program code carrier as a hard disk, a compact disk (CD), a memory card or a floppy disk. Such a computer program product is generally a portable or stationary storage unit as described with reference to FIG. 4. The storage unit may have a memory segment, a memory space, etc. arranged similarly to the memory 320 in the computing device of FIG. 3. The program code may for example be compressed in an appropriate form. In general, the storage unit comprises a computer readable code 331', i.e., a code which may be read by e.g., a processor such as 310, and when run by a computing device, the codes cause the computing device to carry out individual steps in the methods described above.

"An embodiment", "the embodiment" or "one or more embodiments" mentioned herein implies that a particular feature, structure or characteristic described in connection with an embodiment is included in at least one embodiment of the invention. In addition, it is to be noted that, examples of a phrase "in an embodiment" herein do not necessarily all refer to one and the same embodiment.

It is to be noted that the above embodiments illustrate rather than limit the invention, and those skilled in the art may design alternative embodiments without departing the scope of the appended claims. In the claims, any reference sign placed between the parentheses shall not be construed as limiting to a claim. The word "comprise" does not exclude the presence of an element or a step not listed in a claim. The word "a" or "an" preceding an element does not exclude the presence of a plurality of such elements. The invention may be implemented by means of a hardware comprising several distinct elements and by means of a suitably programmed computer. In a unit claim enumerating several apparatuses, several of the apparatuses may be embodied by one and the same hardware item. Use of the words first, second, and third, etc. does not mean any ordering. Such words may be construed as naming.

Furthermore, it is also to be noted that the language used in the description is selected mainly for the purpose of readability and teaching, but not selected for explaining or defining the subject matter of the invention. Therefore, for those of ordinary skills in the art, many modifications and variations are apparent without departing the scope and spirit of the appended claims. For the scope of the invention, the disclosure of the invention is illustrative, but not limiting, and the scope of the invention is defined by the appended claims.

The invention claimed is:

1. An anti-theft method for a mobile terminal, applied in a mobile terminal of which the anti-theft function is not opened, comprising:

receiving a background anti-theft opening instruction from a server, wherein the background anti-theft opening instruction carries verification information of the mobile terminal;

parsing the background anti-theft opening instruction, obtaining the verification information and performing verification; and opening the anti-theft function in the background according to the background anti-theft opening instruction if the verification is passed, wherein the verification information comprises a unique identity identification of the mobile terminal, at least one subscriber identity module (SIM) card number and user account information, wherein the unique identity identification is the international mobile equipment identity (IMEI), wherein the obtaining the verification information and performing verification comprises:

respectively verifying the IMEI and the at least one SIM card number in the verification information;

when the IMEI in the verification information matches the IMEI of the mobile terminal and the at least one SIM card number matches a SIM card number in a list of contacts of the mobile terminal, logging in the user account information to obtain an account identification (ID);

sending the account ID to the server; and receiving a message of passing the account ID verification from the server, and determining that the verification information passes the verification.

2. The method as claimed in claim 1, further comprising: refusing to execute the background anti-theft opening instruction if the verification fails.

3. The method as claimed in claim 1, wherein, after verification information passes the verification, there is further comprised: identifying the at least one SIM card number as a trustworthy number;

after the opening the anti-theft function in the background according to the background anti-theft opening instruction, there is further comprised:

receiving an anti-theft instruction from a SIM card number identified as a trustworthy number; and parsing the anti-theft instruction, and performing an anti-theft operation corresponding to the anti-theft instruction.

4. The method as claimed in claim 1, wherein the account information comprises a username and a password.

5. The method as claimed in claim 1, wherein, after opening the anti-theft function in the background according to the background anti-theft opening instruction, there is further comprised:

receiving an anti-theft instruction from the account ID; and parsing the anti-theft instruction, and performing an anti-theft operation corresponding to the anti-theft instruction.

6. A mobile terminal, comprising:
a memory having instructions stored thereon;
a processor configured to execute the instructions to perform following operations:

receiving a background anti-theft opening instruction from a server, wherein the background anti-theft opening instruction carries verification information of the mobile terminal; parsing the background anti-theft opening instruction, obtaining the verification information and performing verification; and opening the anti-theft function in the background according to the background anti-theft opening instruction if the verification is passed, wherein the verification information comprises a unique identity identification of the mobile terminal, at least one subscriber identity module (SIM) card number and user account information, wherein the unique identity identification is the international mobile equipment identity (IMEI), wherein the obtaining the verification information and performing verification comprises:

respectively verifying the IMEI and the at least one SIM card number in the verification information;

when the IMEI in the verification information matches the IMEI of the mobile terminal and the at least one SIM card number matches a SIM card number in a list of contacts of the mobile terminal, logging in the user account information to obtain an account identification (ID);

sending the account ID to the server; and receiving a message of passing the account ID verification from the server, and determining that the verification information passes the verification.

7. The mobile terminal as claimed in claim 6, the operations further comprising:
refusing to execute the background anti-theft opening instruction if the verification fails.

8. The mobile terminal as claimed in claim 6, wherein, after the verification information passes the verification, the operations further comprise:

identifying the at least one SIM card number as a trustworthy number;

after the opening the anti-theft function in the background according to the background anti-theft opening instruction, the operations further comprise:

receiving an anti-theft instruction from a SIM card number identified as a trustworthy number; and parsing the anti-theft instruction, and perform an anti-theft operation corresponding to the anti-theft instruction.

9. The mobile terminal as claimed in claim 6, wherein, after opening the anti-theft function in the background according to the background anti-theft opening instruction, there is further comprised:

receiving an anti-theft instruction from the account ID; and parsing the anti-theft instruction, and performing an anti-theft operation corresponding to the anti-theft instruction.

10. A non-transitory computer readable medium having instructions stored thereon that, when executed by at least one processor, cause the at least one processor to perform following operations:

receiving a background anti-theft opening instruction from a server, wherein the background anti-theft opening instruction carries verification information of the mobile terminal; parsing the background anti-theft opening instruction, obtaining the verification information and performing verification; and opening the anti-theft function in the background according to the background anti-theft opening instruction if the verification is passed, wherein the verification information comprises a unique identity identification of the mobile terminal, at least one subscriber identity module (SIM) card number and user account information, wherein the unique identity identification is the international mobile equipment identity (IMEI), wherein the obtaining the verification information and performing verification comprises:

respectively verifying the IMEI and the at least one SIM card number in the verification information;

when the IMEI in the verification information matches the IMEI of the mobile terminal and the at least one SIM card number matches a SIM card number in a list of contacts of the mobile terminal, logging in the user account information to obtain an account identification (ID);

sending the account ID to the server; and receiving a message of passing the account ID verification from the server, and determining that the verification information passes the verification.

* * * * *